United States Patent [19]

Miyamoto

[11] Patent Number: 4,949,258

[45] Date of Patent: Aug. 14, 1990

[54] TRANSACTION PROCESSOR WHICH DERIVES A COMMODITY CODE FROM AN ARTICLE CODE AND STORES SALES OF DATA OF BOTH

[75] Inventor: Seiji Miyamoto, Kusatsu, Japan

[73] Assignee: Omron Tateisi Electronics Co., Kyoto, Japan

[21] Appl. No.: 194,037

[22] Filed: May 12, 1988

[30] Foreign Application Priority Data

May 22, 1987 [JP] Japan ................... 62-126389

[51] Int. Cl.⁵ .................. G06F 7/24; G06F 15/21; G07G 1/12
[52] U.S. Cl. .................................. 364/405; 364/404
[58] Field of Search ............... 364/404, 405; 235/494, 235/385

[56] References Cited

U.S. PATENT DOCUMENTS 4,661,908  4/1987  Hamano et al. .......... 364/405

FOREIGN PATENT DOCUMENTS 0152072  11/1981  Japan .
0080761   5/1983  Japan .
0106072   6/1984  Japan .
0158456   9/1984  Japan .
0106570   5/1987  Japan .

Primary Examiner—Clark A. Jablon
Attorney, Agent, or Firm—Dickstein, Shapiro & Morin

[57] ABSTRACT

To register unit commodity codes and further article codes (subdivided commodity codes) without increasing the capacity of a unit commodity management file provided for each transaction processing system or without complicating key operations, the system comprises a first internal memory for storing sales data for each unit commodity code; a second external memory for storing sales data for each article code; a keyboard for entering a buy data including an article code which involves a unit commodity code as a part thereof; a registration controller for extracting a unit commodity code from an inputted article code and updating a sales data corresponding to each unit commodity code stored in the first internal memory on the basis of the entered buy data; and update controller for transmitting a buy data including an article code to the second external memory and updating a sales data corresponding to the article code of the external memory.

3 Claims, 4 Drawing Sheets

| ARTICLE CODE | NUMBER OF ARTICLES BOUGHT | TOTAL AMOUNT OF MONEY |
|---|---|---|
| | | |

Fig. 4

| UNIT COMMODITY CODE | UNIT PRICE | TOTAL NUMBER OF COMMODITIES SOLD | TOTAL AMOUNT OF SALES MONEY |
|---|---|---|---|
| 123456 | 100 | 20 | 2000 |
| | | | |
| | | | |
| | | | |

TRANSACTION PROCESSOR WHICH DERIVES A COMMODITY CODE FROM AN ARTICLE CODE AND STORES SALES OF DATA OF BOTH

BACKGROUND OF THE INVENTION

1. Field of the Invention

The present invention relates generally to a transaction processing system, and more specifically to a transaction processing system represented by an electronic cash register equipped in a super-market, for instance to register commodities sold.

2. Description of the Prior Art

As is well known, electronic cash registers (referred to as ECRs) are equipped in a department store or a super-market in order to register commodities bought by customers. In the conventional ECRs, there is provided a unit commodity management file which stores unit cost data for each unit commodity code and unit sales data (the number of commodities sold, the total amount of sales money, etc.) for each unit commodities code. Further, in the conventional ECRs, whenever a unit commodity code is entered, a unit cost data corresponding to the entered unit commodity code is read from the unit commodity management file to inplement registration processing, and further unit sales data (the number of commodities sold, the total amount of commodities sold or total amount of sales money) are updated in the unit commodity management file.

Here, assumption is made that a unit commodity code is given to a ball-point pen of 100 yen per piece. In this case, since the ball-point pens are classified into two, black and red, for example, kinds, there exists a problem in that it is impossible to grasp the amount of commodities sold or the amount of commodities to be stocked according to colors of the ball-point pens, even if the ball-point pens are registered on the basis of only unit commodity code (without classifying the pens according to colors).

To overcome the above-mentioned problems, it is possible to subdivide a unit commodity and to give a commodity code to each subdivided commodity before registering the sales data. The above-mentioned codes each assigned to each subdivided articles are called article codes. However, when these article codes are adopted, there exists another problem in that a management file of huge capacity must be provided for each ECR, independently.

Further, it is also possible to enter only unit commodity codes when subdivision is not required and to enter subdivided commodity codes only where necessary. In this case, however, there still exists another problem in that an additional key must be depressed to enter the subdivided commodity codes different from the unit commodity codes, and therefore the number of keys is increased and the key depression operation is further complicated.

SUMMARY OF THE INVENTION

With these problems in mind, therefore, it is the primary object of the present invention to provide a transaction processing system which can register unit commodity codes as is conventional and further subdivided commodity codes (article codes) through a simple key operation.

To achieve the above-mentioned object, a transaction processing system according to the present invention comprises: (a) first storing means for storing sales data for each unit commodity code; (b) second storing means, provided externally, for storing sales data for each article code; (c) input means for inputting a buy data including an article code which involves a unit commodity code as a part thereof; (d) registration control means for extracting a unit commodity code from an inputted article code, whenever an article code is inputted through the input means, and updating a sales data corresponding to each unit commodity code stored in the first storing means on the basis of the inputted buy data; and (e) update control means for transmitting a buy data including an article code to the second storing means and updating a sales data corresponding to the article code of the second storing means.

In the transaction processing system of the present invention, whenever a buy data (article code, number of commodities sold, etc.) including an article code is inputted, a unit commodity code is extracted from the inputted article code, a sales data corresponding to the unit commodity code stored in the first storing means is updated; the buy data used for updating and the article code are transmitted to the second storing means provided externally; and a sales data corresponding to the article code in the second storing means is updated.

According to the present invention, whenever a buy data including an article code is inputted, since a unit commodity code is extracted from the inputted article code to update a sales data corresponding to the unit commodity code stored in the first storing means, and further the buy data used for updating and the articled code are transmitted to the second storing means provided externally to update the sales data corresponding to the article code stored in the second storing means, it is possible to register unit commodity codes in the first and internal storing means and article codes in the second and external storing means without increasing the capacity of the first and internal storing means. That is, ordinary commodities sold can be registered on the basis of unit commodity codes in the ECR as is conventional, and further subdivided articles sold can be registered in the external memory on the basis of article codes through a simple operation. These registered data are used for sales management and stock management.

BRIEF DESCRIPTION OF THE DRAWINGS

The features and advantages of transaction processing system according to the present invention will be more clearly appreciated from the following description taken in conjunction with the accompanying drawings in which:

FIG. 4 is a table for assistance in explaining a unit commodity management file stored in a RAM shown in FIG. 1;

DETAILED DESCRIPTION OF THE PREFERRED EMBODIMENT

Figures 1, 3:
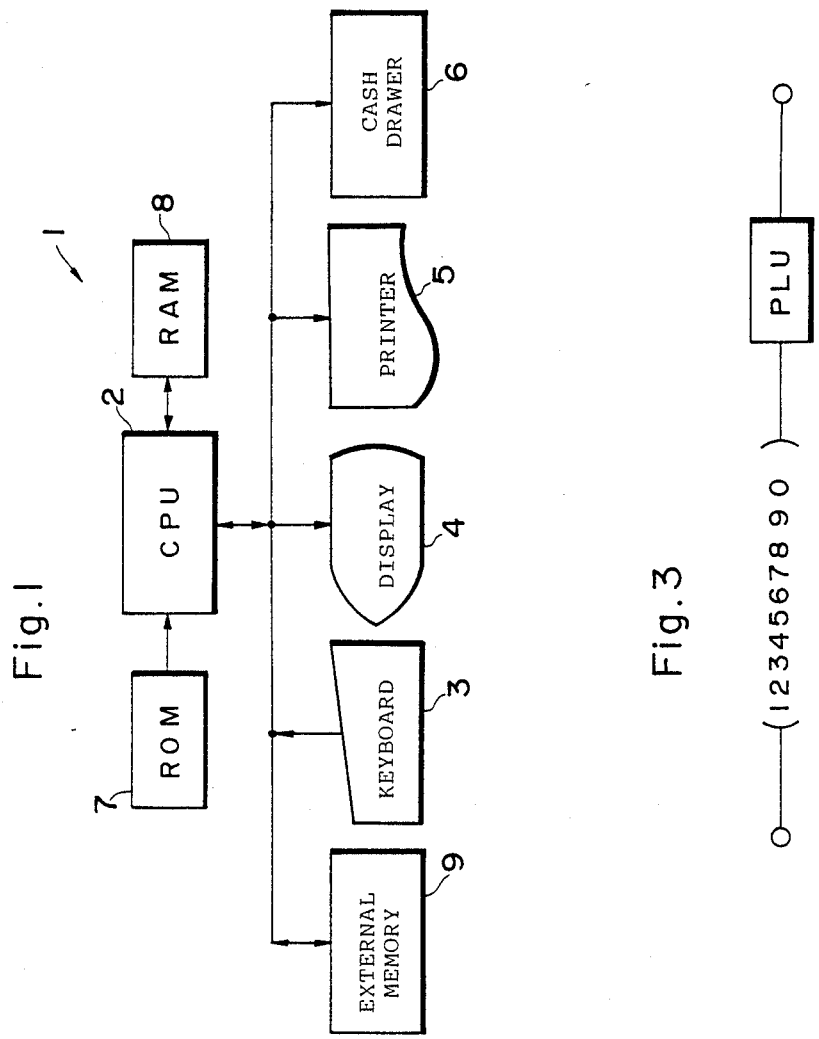
FIG. 1 is a schematic block diagram showing an embodiment of the transaction processing system (ECR) according to the present invention.
FIG. 3 is a diagram for assistance in explaining the key entry operation of the keyboard shown in FIG. 2.
Figures 2, 5:
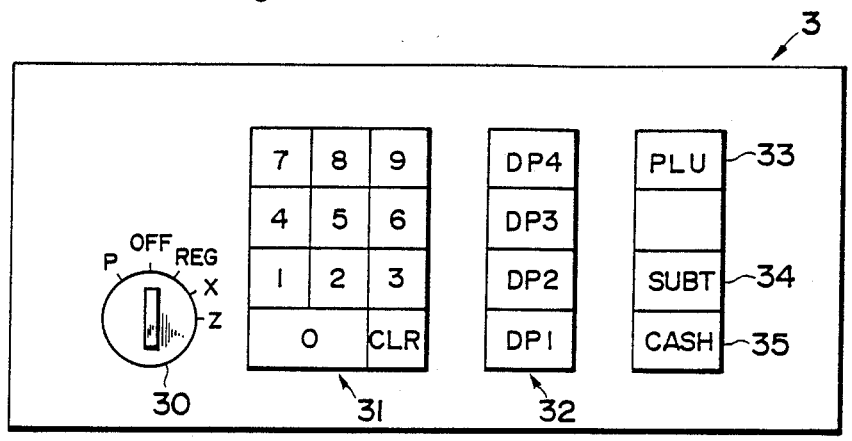
FIG. 2 is an illustration showing keyboard arrangement of the system shown in FIG. 1.
FIG. 5 is a table for assistance in explaining a message transmitted from the system to an external memory.
Figure 6:
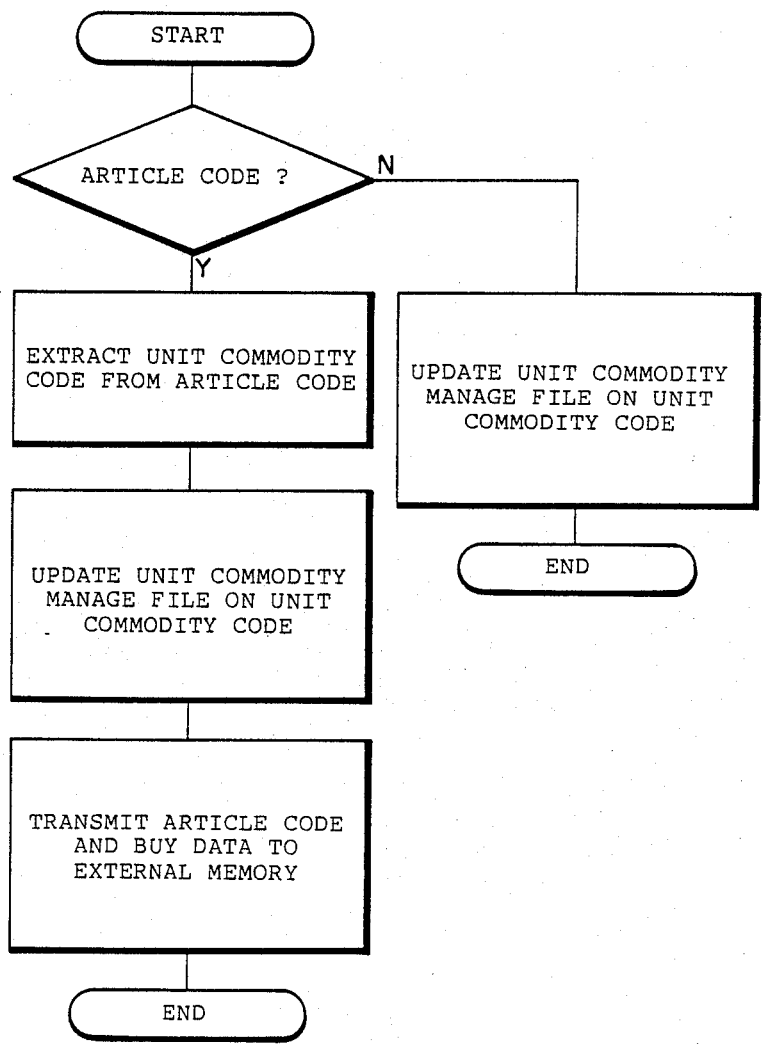
FIG. 6 is a flowchart for assistance in explaining the operation of the system according to the present invention.

FIG. 1 is a block diagram showing an electronic cash resistor (ECR) as an embodiment of the transaction processing system according to the present invention. The ECR 1 includes a CPU 2, to which a keyboard 3, a display unit 4, a printer 5, a cash drawer 6, a ROM 7, a RAM 8 and an external memory unit 9 are connected, respectively. The keyboard 3 includes various keys as shown in FIG. 2 (described later in more detail). The display unit 4 displays operation guidance in the form of characters and further data entered through the keyboard 3. The printer 5 issues a printed sheet when the commodity registration is performed. The cash drawer 6 stores cash. The ROM 7 stores an operation program of the CPU 2 as shown in FIG. 6 in the form of a flowchart. The RAM 8 stores a unit commodity management file as shown in FIG. 4 (described later). The external memory unit 9 is a floppy disk, a magnetic storage device, a magnetic tape device, etc.

FIG. 2 shows a key arrangement of the keyboard 3 shown in FIG. 1. In FIG. 2, the keyboard 3 is provided with a mode selector switch 30, ten-key pad 31, section keys 32, a PLU key 33, a SUBT key 34, and a CASH key 35, etc.

The mode selector key 30 is set to any one of P position (where a program is set), OFF position (where power is turned off), REG position (where registration is made), X position (where an inspection report is printed), and Z position (where a calculation report is printed).

The ten-key pad 31 is used to enter unit commodity codes, articles codes, etc. Here, the unit commodity code is a code assigned to a single commodity such as ball-point pens, and the article code is a code assigned to a single article when a plurality of articles having the same unit commodity code are further divided according to colors, for instance. For example, in the case of ball-point pens of 100 yen, a unit commodity code of "1 2 3 4 5 6" is assigned to the ball-point pens, and an article code of "1 2 3 4 5 6 7 8 9 0" is assigned to a red ball-point pen of 100 yen. Further, it is possible to assign some article codes to articles according to shapes, pattern or design without being limited to only commodity colors. As described above, an article code includes a unit commodity code. In the above example, the six higher significant digits represent a unit commodity code.

The section key 32 is used to enter one of section codes. The PLU key 33 is used to enter a unit commodity code or an article code after the keys of ten-key pad 31 have been depressed. The SUBT key 34 is used to calculate a total amount of money per customer. The CASH key 35 is used to settle the payment.

FIG. 3 is a diagram for assistance in explaining the operation of the keyboard shown in FIG. 2. In FIG. 3, an article code of ten digits is entered through the ten-key pad 31 and then the PLU key 33 is depressed. Thereafter, it is possible to enter the number of commodities sold.

FIG. 4 shows an example of unit commodity management file stored in the RAM 8 shown in FIG. 1. In FIG. 4, a unit commodity code, a unit price data, the total number of commodities so far sold, and the total amount of money of commodities so far sold are stored for each commodity in the unit commodity management file 80.

FIG. 5 shows an example of a transmission message transmitted from the ECR 1 to the external memory unit 9. In FIG. 5, the transmission message is composed of an article code, the number of articles bought and the total amount of money paid by each customer.

FIG. 6 shows a flowchart for assistance in explaining the operation of the embodiment of the present invention. The operation of the present invention will be described with reference to FIG. 6.

The operator enters a unit commodity code or an article code and the number of commodities sold (where necessary) (buy data) for each commodities bought by each customer in order to perform transaction registration. When an article code is entered, the operator depressed the PLU key as shown in FIG. 3. When a code is entered, the CPU 2 of the ECR 1 checks whether the entered code is a unit commodity code or an article code on the basis of the number of code digits. That is, the CPU discriminates a unit commodity code when a six-digits code is entered but an article code when a ten-digits code is entered. When a unit commodity code is entered, the CPU 2 retrieves the unit commodity management file 80 on the basis of the entered unit commodity code, reads a unit price data corresponding to the unit commodity code, calculates a total amount of money paid by a customer by multiplying the unit price data by the number of commodities bought, displays the calculated data on the display unit 4, prints the calculated data to issue a receipt. In addition, the CPU 2 updates the total number of commodities so far sold and the total amount of money of commodities so far sold in the unit commodity management file 80.

On the other hand, when an article code is entered, the CPU 2 reads the six higher significant digits (unit commodity code) from a ten-digits code (article code), updates the unit commodity management file on the basis of the read unit commodity code in the same transaction registration as stated above. Here, the information that six higher significant digits in a ten-digits article code represent a unit commodity code is previously stored in the RAM 8. Thereafter, the CPU 2 edits a transmission message as shown in FIG. 5 on the basis of the entered article code and buy data (the number of articles bought and the total amount of money payed by a customer) used for updating the unit commodity management file 80, transmits the edited message to the external memory unit 9, and updates data corresponding to the article code in the external memory unit 9 with use of the transmitted data. These transaction data stored in the external memory unit 9 are given to a personal computer connected to the external memory unit 9, calculated or processed by entering predetermined commands through a keyboard of the personal computer, and printed out by a printer, so that these data can be useful for grasping the sales amount, stock amount, etc. for each article code.

What is claimed is:

1. A transaction processing system comprising:
    (a) first storing means for storing sales data for each unit commodity code;
    (b) second storing means for storing sales data for each article code;
    (c) input means for inputting buy data including at least one of a unit commodity code and an article code which includes a unit commodity code as a part thereof;
    (d) means for determining whether inputted buy data is an article code or a unit commodity code;

(e) registration control means for updating a sale data corresponding to a unit commodity code stored in said first storing means on the basis of the inputted buy data when the entered code is determined to be the unit commodity code, and for extracting unit commodity code from an inputted article code and updating a sale data corresponding to a unit commodity code stored in said first storing means when the entered code is determined to be the article code; and (f) update control means for transmitting buy data which includes an article code to said second storing means and updating a sales data of said second storing means corresponding to the article code.

2. The transaction processing system of claim 1, wherein said input means inputs an article code and the number of articles sold as a buy data, and said registration control means updates a sales data corresponding to the unit commodity code on the basis of the number of articles inputted.

3. An apparatus as in claim 1 wherein said second storing means is provided externally.

* * * * *